(12) United States Patent
Lupescu et al.

(10) Patent No.: US 8,166,957 B2
(45) Date of Patent: *May 1, 2012

(54) EXHAUST TREATMENT SYSTEM FOR INTERNAL COMBUSTION ENGINE

(75) Inventors: Jason Aaron Lupescu, Ypsilanti, MI (US); Daniel Joseph Styles, Canton, MI (US); James Michael Kerns, Trenton, MI (US); Michael James Uhrich, West Bloomfield, MI (US); Stephen B. Smith, Livonia, MI (US); David A. May, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/170,989

(22) Filed: Jun. 28, 2011

(65) Prior Publication Data

US 2011/0252794 A1 Oct. 20, 2011

Related U.S. Application Data

(63) Continuation of application No. 12/706,407, filed on Feb. 16, 2010, now Pat. No. 7,987,837.

(51) Int. Cl.
*F02B 47/08* (2006.01)
*F02B 47/00* (2006.01)
(52) U.S. Cl. .............. 123/568.21; 123/568.2; 123/559.1
(58) Field of Classification Search .............. 123/568.2, 123/568.21, 568.19, 568.17, 559.1, 316; 701/108; 60/605.1, 605.2
See application file for complete search history.

(56) References Cited

U.S. PATENT DOCUMENTS

| 2,889,904 | A | 6/1959 | Martinoli |
| 4,020,809 | A | 5/1977 | Kern et al. |
| 5,592,925 | A | 1/1997 | Machida et al. |
| 7,267,139 | B2 | 9/2007 | Blomquist et al. |
| 2009/0120061 | A1 | 5/2009 | Elwart et al. |
| 2009/0120063 | A1 | 5/2009 | Uhrich et al. |
| 2009/0120064 | A1 | 5/2009 | Uhrich et al. |
| 2009/0120065 | A1 | 5/2009 | Uhrich et al. |
| 2009/0120067 | A1 | 5/2009 | Elwart et al. |
| 2009/0132153 | A1* | 5/2009 | Shutty et al. ................. 701/108 |
| 2010/0024396 | A1 | 2/2010 | Lupescu et al. |

OTHER PUBLICATIONS

Yamakazi, Hideharu et al. "Research on HC Adsorption Emission System." SAE Technical Paper Series. Mar. 8-11, 2004. vol. 2004-01-1273; 11 pages. Warrendale, PA.

Hadler, Jens et al. "Volkswagen's New 2.0 l TDI Engine for the Most Stringent Emission Standards—Part 1." MTZ. May 2008. vol. 39; pp. 12-18.

* cited by examiner

*Primary Examiner* — Mahmoud Gimie
(74) *Attorney, Agent, or Firm* — Julia Voutyras; Alleman Hall McCoy Russell & Tuttle LLP

(57) ABSTRACT

Systems and methods are provided for operating an engine exhaust system. In one example, a system comprises a first valve, and a second valve coupled to the first valve via a shaft. A first position of the shaft situates the first valve closed and the second valve open, a second position situates the second valve closed and the first valve open by a first amount, and a third position situates the second valve closed and the first valve open by a second, larger amount.

18 Claims, 10 Drawing Sheets

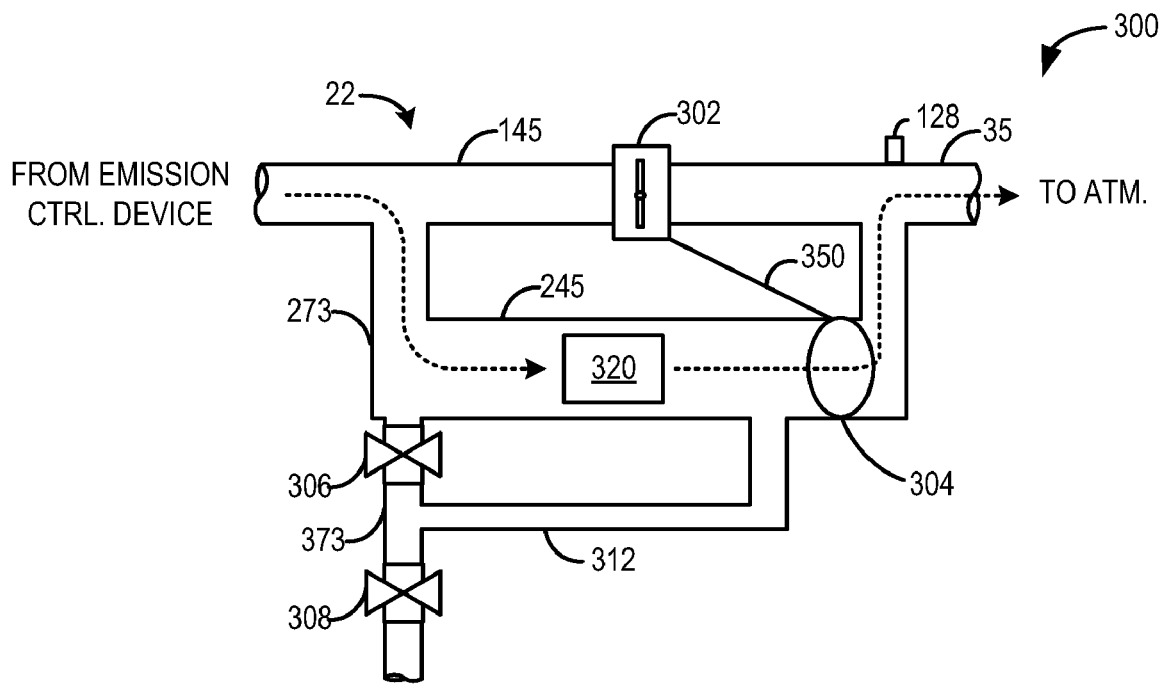
FIG. 3 (Mode A)
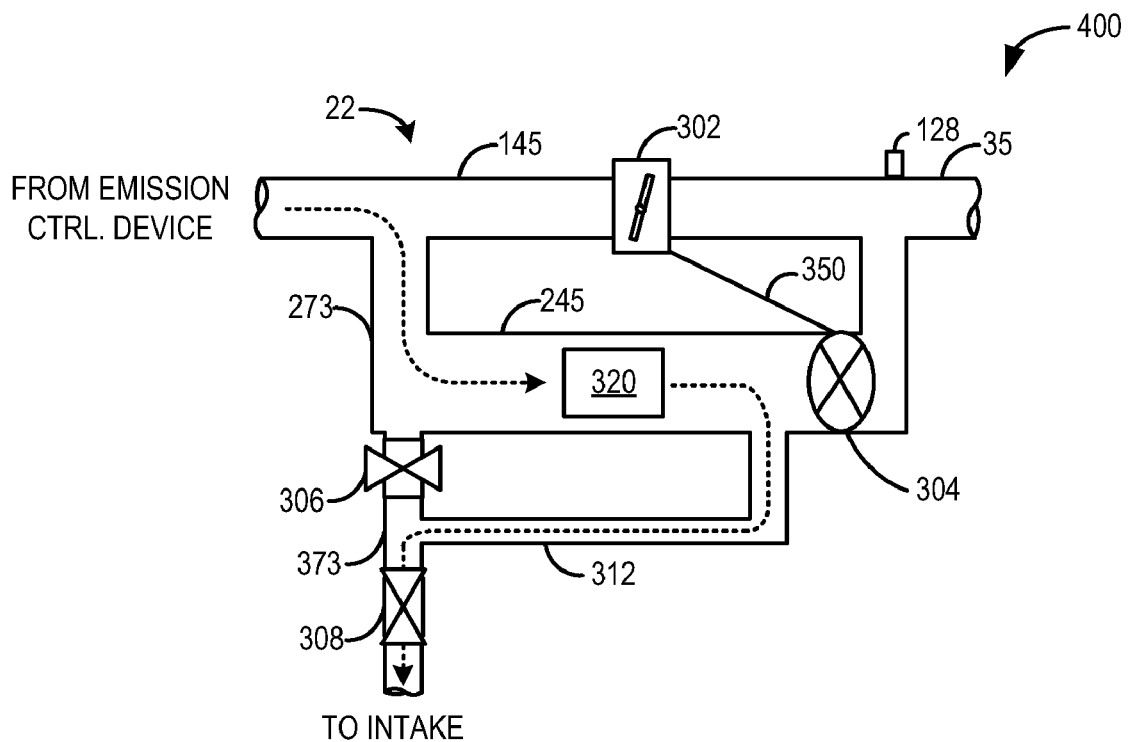
FIG. 4 (Mode B)

FIG. 5 (Mode C)

| Mode | Throttle | Isolation valve | Inlet canister Valve | EGR valve |
|---|---|---|---|---|
| A: HC storage | Closed | Open | Closed | Closed |
| B: Purge | Open | Closed | Closed | Open |
| C: EGR | Open | Closed | Open | Open |
| I: Trap isolation | Open | Closed | Closed | Closed |

EXHAUST TREATMENT SYSTEM FOR INTERNAL COMBUSTION ENGINE

CROSS REFERENCE TO RELATED APPLICATIONS

The present application is a continuation of U.S. patent application Ser. No. 12/706,407 filed Feb. 16, 2010, the entire contents of which are incorporated herein by reference.

FIELD

The present description relates generally to an exhaust treatment system for a combustion engine configured to trap hydrocarbon emissions.

BACKGROUND/SUMMARY

Engine exhaust systems utilize hydrocarbon retaining devices, such as hydrocarbon (HC) traps, to retain cold start emissions (HC storing). The retained HCs may be reacted or recirculated into the engine intake system at a later time (HC purging), for example after the exhaust temperature has warmed up sufficiently. Engine exhaust systems may also be coupled to engine exhaust gas recirculation (EGR) systems wherein an EGR flow is used to purge stored HCs from the HC traps. For example, one or more exhaust valves may be used to adjust an amount and direction of exhaust flow through the exhaust treatment system based on whether a storing or a purging operation of the HC trap is desired, or whether an EGR operation is desired. The one or more exhaust valves may be integrated such that the opening of one valve is coupled to the closing of another valve by a common actuator.

However, integrated exhaust valves may have limited flow characteristics. For example, during conditions when it is desired to purge stored HCs into the engine intake by adjusting an EGR flow, it may not be possible to maintain a first exhaust valve closed, to divert exhaust away from the tailpipe, while adjusting the degree of opening of a coupled second exhaust valve to adjust the amount and/or direction of EGR purge flow, using such integrated valve systems. Rather, it may be required to decouple them and use independent actuators. As such, the decoupling of the valves and the use of dedicated actuators may add substantial operating costs. The limited flow characteristics may also affect the efficiency of the exhaust treatment system, thereby degrading the quality of exhaust emissions.

Some of the above issues may be addressed by an engine exhaust system comprising, a first valve, and a second valve coupled to the first valve via a shaft. A first position of the shaft may close the first valve and open the second valve. A second position of the shaft may close the second valve and open the first valve by a first amount. A third position of the shaft may close the second valve and open the first valve by a second, larger amount.

In one example, an engine exhaust may include an integrated exhaust valve system comprising a first throttle valve and a second isolation valve mounted on a common shaft. The valves may be operated by a common actuator through the common actuation shaft. The throttle valve may include a throttle plate enabling the valve to be fully opened, fully closed, or positioned at a wide range of opening angles therebetween. The isolation valve may be a ball valve with an inner ball or cylinder having a tunnel there-through, such that flow of exhaust gas through the tunnel may be coupled to flow of exhaust gas through the throttle plate based on the position of the inner ball or cylinder. The throttle valve may be positioned in a first conduit of the engine exhaust, while the isolation valve may be positioned in a second conduit of the engine exhaust, disposed parallel to the first conduit. The second conduit may further include a HC trap upstream of the isolation valve. Each of the first and second conduits may further communicate with an exhaust tailpipe.

During a first condition, for example during HC storing conditions, the actuator may be operated to position the valve system in a first configuration with the throttle valve fully closed and the isolation ball valve open. In this position, exhaust gas may be diverted away from the first conduit (and the throttle valve) into the second conduit (and the isolation valve). Thus, exhaust gas may be routed through the HC trap of the second conduit before being vented to the atmosphere through an exhaust tailpipe. In this way, exhaust HCs may be stored in the HC trap, for example, before a catalyst light-off temperature is reached.

During a second condition, for example during HC purging or EGR conditions, the actuator may be operated to position the valve system in a one of a second or third configuration with the isolation valve closed and the throttle valve partially open. Specifically, in the second configuration, the throttle valve may be open by a first amount, while in the third configuration, the throttle valve may be open by a second, larger amount while the isolation valve remains closed. The first and second amounts may be adjusted based on a desired amount of EGR, a desired amount of purging, a desired HC trap inlet temperature, a desired exhaust catalyst temperature, etc. The second conduit may also communicate with an engine intake through an EGR passage. Thus, when in the second or third configuration, at least some exhaust gas may be diverted to the engine intake via the EGR passage. In one example, during HC purging conditions, an EGR valve in the EGR passage may be additionally adjusted so that at least some exhaust gas is diverted to the engine intake through the HC trap. At the same time, at least some exhaust gas may be vented to the atmosphere following processing in an emission control device. In this way, HCs stored in the HC trap during a previous storing operation may be purged to the engine intake, while at least some exhaust gas is vented to the atmosphere after being processed in the emission control device. In another example, during EGR conditions, the EGR valve may be adjusted so that at least some exhaust gas is diverted to the engine intake while bypassing the HC trap, while at least some exhaust gas is vented to the atmosphere after being processed in the emission control device. In this way, an efficient EGR operation may be enabled using the integrated valve system and without requiring additional EGR system.

In this way, a common actuator and shaft may be used to vary the opening of the throttle valve while the isolation valve remains closed. By enabling a wide range of throttle positions without affecting the isolation valve position, an integrated exhaust valve system may be used to advantageously couple the EGR system with the exhaust treatment system while providing component reduction advantages.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 3-5 show example embodiments of the exhaust treatment system of FIG. 1 in various modes of operation.

DETAILED DESCRIPTION

Figure 1:
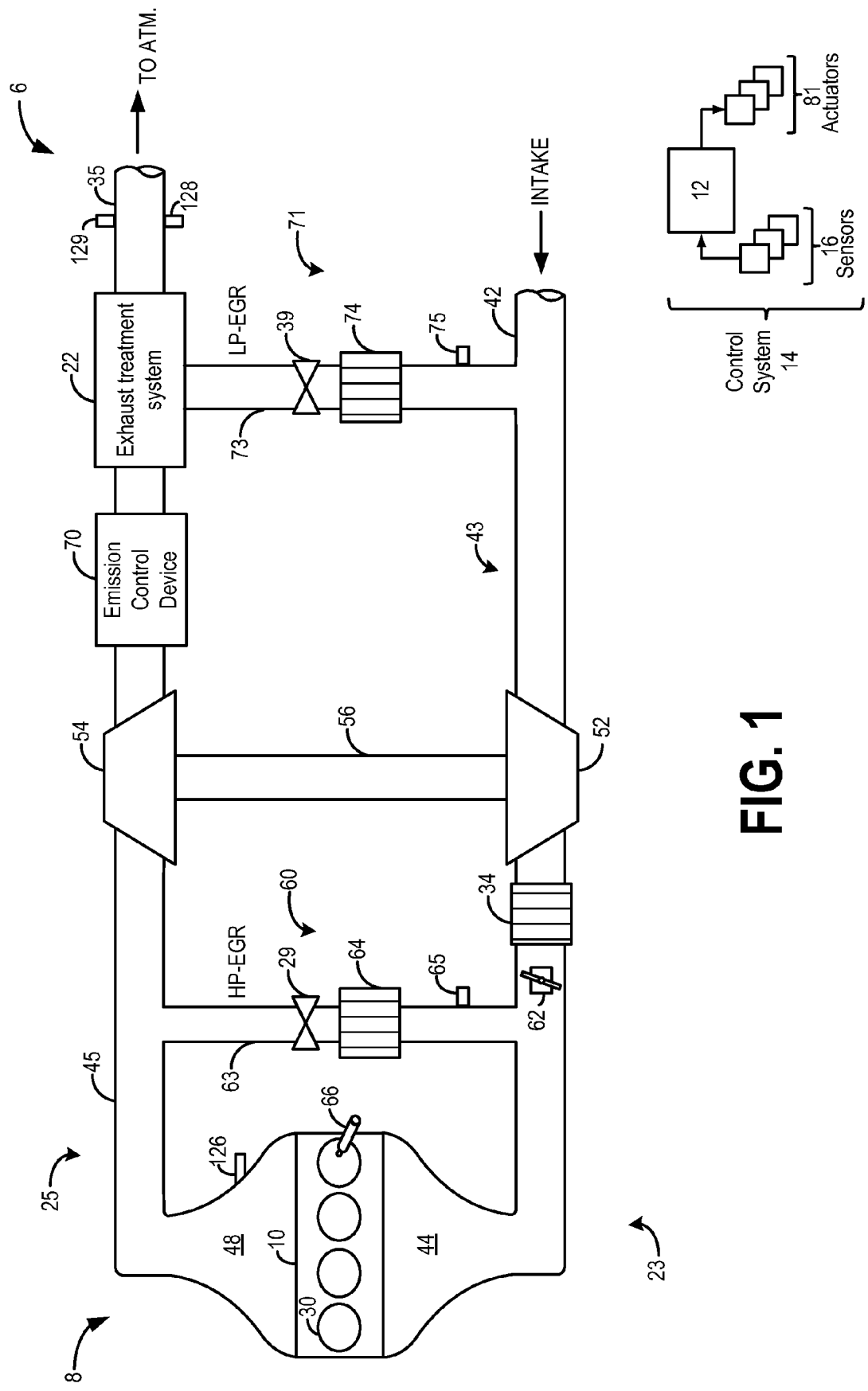
FIG. 1 shows a schematic depiction of an internal combustion engine and an associated exhaust treatment system.
Figure 9:
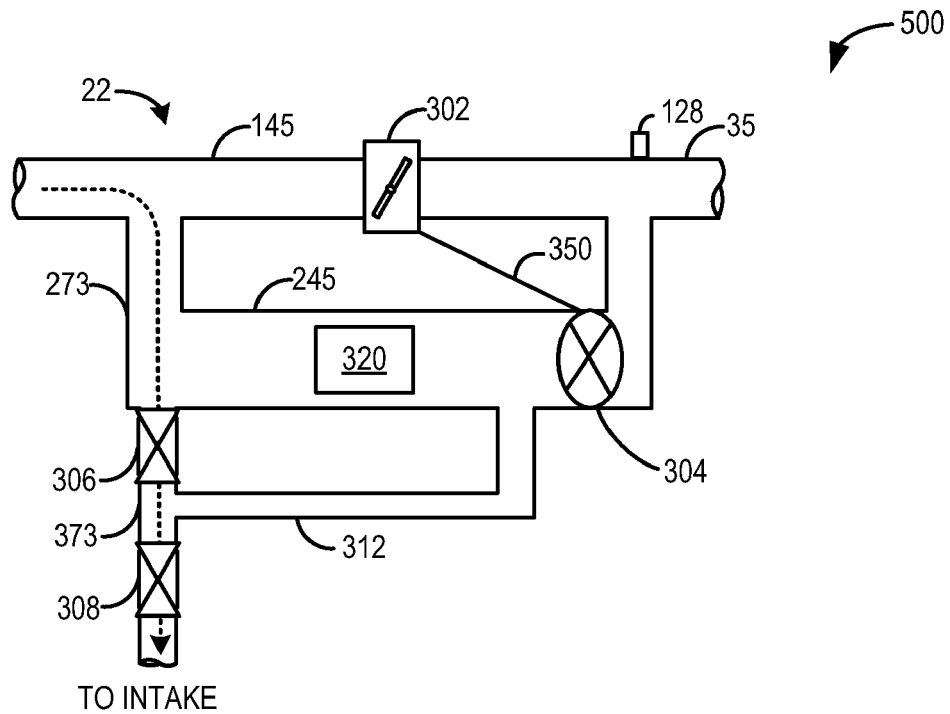
FIG. 9 shows a table summarizing the position of the various valves of the exhaust treatment system of FIG. 1 in the various operating modes.

The following description relates to systems and methods for operating an exhaust treatment system associated with an internal combustion engine for removing hydrocarbons from exhaust emissions. The exhaust treatment system may be used, for example, with a diesel engine wherein cooler exhaust temperatures are encountered. As shown in FIG. 1, by coupling the operation of the exhaust treatment system with a low pressure EGR system of the engine, advantageous synergies may be attained. As shown in FIGS. 3-5, by coordinating the opening of various exhaust treatment system valves with an EGR valve of the EGR system, cold start emission HCs may be effectively trapped for later reaction, or recirculated into the engine intake system. The exhaust treatment system may include an integrated exhaust valve system (FIGS. 6A-K) comprising an exhaust throttle valve coupled to an isolation valve. The exhaust valve system may be arranged such that the opening of one valve is linked to the closing of the other. Furthermore, the valves may be arranged such that the opening of one valve may be widely varied while the other valve remains closed (FIG. 8). An engine controller may be configured to perform a routine, such as the routine of FIG. 7, to appropriately coordinate the opening/closing of the exhaust treatment system valves with the opening/closing of an EGR valve based on engine operating modes (as summarized in FIG. 9). By performing such routines, cold start HC emissions may be trapped until a threshold temperature, such as a catalyst light-off temperature, is attained. After threshold temperatures have been reached, the stored HCs may be recirculated into the engine intake using an EGR flow. Alternatively, when only EGR is desired, an EGR flow may be provided which bypasses the HC retaining devices. Further, during select conditions, when no purging or EGR is desired, the HC retaining device may be isolated from the exhaust, and exhaust gases may be released to the atmosphere. In this way, exhaust treatment systems may be configured with fewer components and the quality of cold-start exhaust emissions may be improved.

FIG. 1 shows a schematic depiction of a vehicle system 6. The vehicle system 6 includes an engine system 8 coupled to an exhaust treatment system 22. The engine system 8 may include an engine 10 having a plurality of cylinders 30. The engine 10 includes an intake 23 and an exhaust 25. The intake 23 includes a throttle 62 fluidly coupled to the engine intake manifold 44 via an intake passage 42. The exhaust 25 includes an exhaust manifold 48 leading to an exhaust passage 45 that routes exhaust gas to the atmosphere via tailpipe 35. Exhaust passage 45 may include one or more emission control devices 70, which may be mounted in a close-coupled position in the exhaust. One or more emission control devices may include a three-way catalyst, lean NOx trap, oxidation catalyst, etc.

Engine 10 may further include a boosting device, such as a turbocharger, including a compressor 52 arranged along intake passage 42. Compressor 52 may be at least partially driven by a turbine 54, arranged along exhaust passage 45, via shaft 56. In alternate embodiments, the boosting device may be a supercharger, wherein compressor 52 may be at least partially driven by the engine and/or an electric machine, and may not include a turbine. The amount of boost (or compression) provided to one or more cylinders of the engine via a turbocharger or supercharger may be varied by controller 12. In some embodiments, an optional charge after-cooler 34 may be included downstream of compressor 52 in intake passage 42. The after-cooler may be configured to reduce the temperature of the intake air compressed by the boosting device.

Engine 10 may further include one or more exhaust gas recirculation (EGR) systems configured to route a portion of exhaust gas from exhaust passage 45 to intake passage 42. For example, engine 10 may include a first high pressure-EGR (HP-EGR) system 60 and a second low pressure-EGR (LP-EGR) system 71. HP-EGR system 60 may include HP-EGR passage 63, HP-EGR valve 29, and HP-EGR cooler 64. Specifically, HP-EGR passage 63 may be configured to route a portion of exhaust gas from exhaust passage 45, upstream of turbine 54, to intake passage 42, downstream of compressor 52, and downstream of throttle 62. As such, HP-EGR system 60 may be operated when differential pressures are advantageous to flow HP-EGR, such as an un-boosted case when there is vacuum in the intake manifold, or at a high speed/high load boosted case when exhaust manifold pressure is greater than intake manifold pressure.

LP-EGR system 71 may be coupled to engine intake 44 through air induction system 43. LP-EGR system 71 may include LP-EGR passage 73, LP-EGR valve 39, and LP-EGR cooler 74. LP-EGR passage 73 may be configured to route a portion of exhaust gas from exhaust passage 45, downstream of turbine 54, to air induction system 43, upstream of compressor 52 and throttle 62. LP-EGR system 71 may be operated in the presence or absence of boost from the boosting device in areas where the boost device can process the extra flow from the LP-EGR system. HP-EGR cooler 64 and LP-EGR cooler 74 may be configured to lower the temperature of exhaust gas flowing through the respective EGR passages before recirculation into the engine intake. It will be appreciated that other components may be included in engine 10, such as a variety of valves and sensors, as described herein and as shown in the example engine of FIGS. 2-5.

The amount and/or rate of HP-EGR provided to intake manifold 44 may be varied by controller 12 via HP-EGR valve 29. HP-EGR sensor 65 may be positioned within HP-EGR passage 63 to provide an indication of, for example, a pressure, pressure difference, or mass flow, of HP-EGR flow through HP-EGR system 60. Similarly, the amount and/or rate of LP-EGR provided to air induction system 43 may be varied by controller 12 via LP-EGR valve 39. LP-EGR sensor 75 may be positioned within LP-EGR passage 73 to provide an indication of, for example, a pressure, pressure difference, or mass flow, of LP-EGR flow through LP-EGR system 71. It will be appreciated that additional sensors, such as an EGR composition sensor and/or an EGR air-fuel ratio sensor, may be included in engine system 8 at locations after the respective EGR flow has mixed with the air flow.

Under some conditions, exhaust gas recirculation through HP-EGR system 60 and/or LP-EGR system 71 may be used, for example, based on the flow capability of each system, to reduce NO formation of combustion by reducing peak combustion temperatures, increase combustion efficiency by mitigating knock and reducing heat losses, reducing "enrichment" requirements and reducing pumping work. Under such EGR-only conditions, an EGR flow may be recirculated to the engine intake without passing through the HC retaining devices of exhaust treatment system 22, as shown in FIG. 5. Under some conditions, for example HC purging conditions, the EGR flow through the exhaust treatment system 22 and the LP-EGR system 71 may also be used to purge stored hydrocarbons from exhaust treatment system 22 into the engine intake (herein also referred to as an EGR purge flow), as shown in FIG. 4. Specifically, by coupling exhaust treatment system 22 to LP-EGR system 71, advantageous synergies between the exhaust treatment system and the EGR system may be achieved.

Exhaust treatment system 22 may be coupled to exhaust 25 along exhaust passage 45. In one example, when exhaust passage 45 includes an exhaust throttle and an exhaust cooler, exhaust treatment system 22 may be positioned downstream of the exhaust throttle and upstream of the exhaust cooler. Exhaust treatment system 22 may include one or more HC retaining devices, such as HC traps. Exhaust treatment system 22 may further include an integrated valve system (shown in FIGS. 6A-K) with a throttle valve coupled to an integrated valve through a commonly actuated shaft. By adjusting the configuration of the valves of the integrated valve system, HC storage and purging operations of the exhaust treatment system may be coordinated with EGR operations of the EGR system without using additional components. Under some operating conditions, for example, when the emission control device is not yet at its light-off temperature (e.g., a temperature at which the device reaches a selected, sufficiently high, conversion efficiency for a particular exhaust constituent), exhaust gases may be routed to exhaust treatment system 22, before being vented to the atmosphere along tailpipe 35, as shown in FIG. 4. In this way, an increased amount of cold start hydrocarbon (HC) emissions may be stored in exhaust treatment system 22 while the exhaust gases heat emission control device 70. Then, once the emission control device 70 has reached its operating temperature, the retained HCs may be purged from exhaust treatment system 22 to the engine intake 23 via LP-EGR passage 73, as described below herein.

Engine 10 may be controlled at least partially by a control system 14 including controller 12 and by input from a vehicle operator via an input device (not shown). Control system 14 is shown receiving information from a plurality of sensors 16 (various examples of which are described herein) and sending control signals to a plurality of actuators 81 (various examples of which are described herein). As one example, sensors 16 may include exhaust gas sensor 126 located upstream of the emission control device, exhaust temperature sensor 128 and exhaust pressure sensor 129 located downstream of the emission control device and exhaust treatment system in tailpipe 35, HP-EGR sensor 65 in HP-EGR passage 63, and LP-EGR sensor 75 in LP-EGR passage 73. Other sensors such as additional pressure, temperature, air/fuel ratio and composition sensors may be coupled to various locations in the vehicle system 6. As another example, actuators 81 may include fuel injector 66, HP-EGR valve 29, LP-EGR valve 39, and throttle 62. Other actuators, such as a variety of additional valves and throttles, may be coupled to various locations in the vehicle system 6, for example, as described herein in FIGS. 2-5 with regard to the various valves and throttles of exhaust treatment system 22. Controller 12 may receive input data from the various sensors, process the input data, and trigger the actuators in response to the processed input data based on instruction or code programmed therein corresponding to one or more routines. An example control routine is described herein with regard to FIG. 7.

Figure 2:
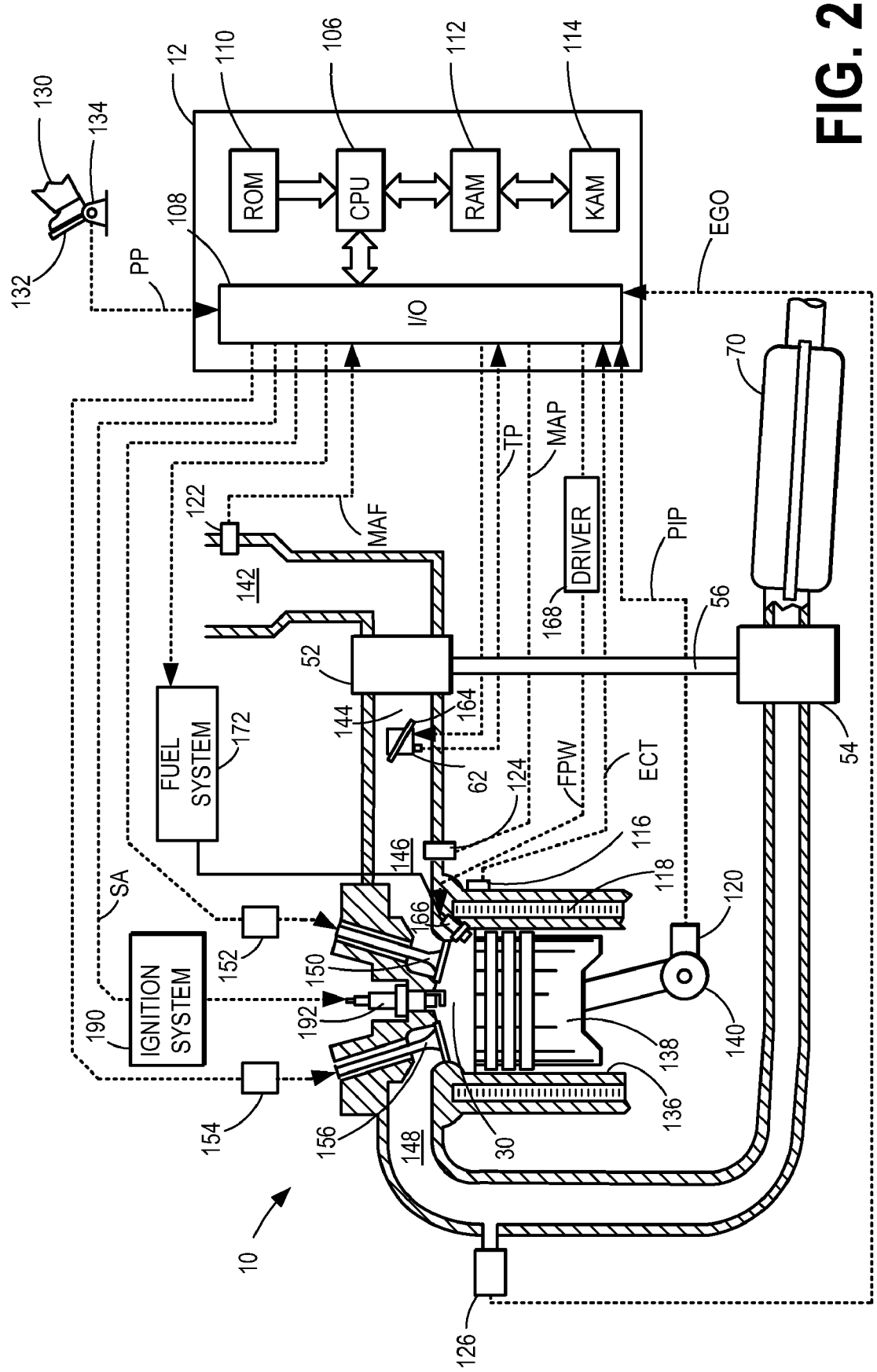
FIG. 2 shows a partial engine view.

FIG. 2 depicts an example embodiment of a combustion chamber or cylinder of internal combustion engine 10. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Cylinder (i.e. combustion chamber) 30 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 30 can receive intake air via a series of intake air passages 142, 144, and 146. Intake air passage 146 can communicate with other cylinders of engine 10 in addition to cylinder 30. In some embodiments, one or more of the intake passages may include a boosting device such as a turbocharger or a supercharger. For example, FIG. 2 shows engine 10 configured with a turbocharger including a compressor 52 arranged between intake passages 142 and 144, and an exhaust turbine 54 arranged along exhaust passage 148. Compressor 52 may be at least partially powered by exhaust turbine 54 via a shaft 56. However, in other examples, such as where engine 10 is provided with a supercharger, exhaust turbine 54 may be optionally omitted, where compressor 52 may be powered by mechanical input from a motor or the engine. Further still, shaft 56 may be coupled to an electric motor (as depicted in FIG. 1) to provide an electric boost, as needed. A throttle 62 including a throttle plate 164 may be provided along an intake passage of the engine for varying the flow rate and/or pressure of intake air provided to the engine cylinders. For example, throttle 62 may be disposed downstream of compressor 52 as shown in FIG. 2, or may be alternatively provided upstream of compressor 52.

Exhaust passage 148 can receive exhaust gases from other cylinders of engine 10 in addition to cylinder 30. Exhaust gas sensor 126 is shown coupled to exhaust passage 148 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor. Emission control device 70 may be a three way catalyst (TWC), NOx trap, particulate filter, various other emission control devices, or combinations thereof.

Each cylinder of engine 10 may include one or more intake valves and one or more exhaust valves. For example, cylinder 30 is shown including at least one intake poppet valve 150 and at least one exhaust poppet valve 156 located at an upper region of cylinder 30. In some embodiments, each cylinder of engine 10, including cylinder 30, may include at least two intake poppet valves and at least two exhaust poppet valves located at an upper region of the cylinder.

Intake valve 150 may be controlled by controller 12 via actuator 152. Similarly, exhaust valve 156 may be controlled by controller 12 via actuator 154. During some conditions, controller 12 may vary the signals provided to actuators 152 and 154 to control the opening and closing of the respective intake and exhaust valves. The position of intake valve 150 and exhaust valve 156 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 30 may alternatively include an intake valve controlled via electric valve actuation, and an exhaust valve controlled via cam actuation including CPS and/or VCT. In other embodiments, the intake and exhaust valves may be controlled by a common valve actuator or actuation system, or a variable valve timing actuator or actuation system. The engine may further include a cam position sensor whose data may be merged with the crankshaft position sensor to determine an engine position and cam timing.

Cylinder 30 can have a compression ratio, which is the ratio of volumes when piston 138 is at bottom center to top center. Conventionally, the compression ratio is in the range of 9:1 to 10:1. However, in some examples where different fuels are used, the compression ratio may be increased.

In some embodiments, each cylinder of engine 10 may include a spark plug 192 for initiating combustion. Ignition system 190 can provide an ignition spark to combustion chamber 30 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 30 is shown including fuel injector 166 coupled directly to cylinder 30. Fuel injector 166 may inject fuel directly therein in proportion to the pulse width of signal FPW received from controller 12 via electronic driver 168. In this manner, fuel injector 166 provides what is known as direct injection (hereafter referred to as "DI") of fuel into combustion cylinder 30. While FIG. 2 shows injector 166 as a side injector, it may also be located overhead of the piston, such as near the position of spark plug 192. Alternatively, the injector may be located overhead and near the intake valve. Fuel may be delivered to fuel injector 166 from high pressure fuel system 172 including a fuel tank, fuel pumps, and a fuel rail. Alternatively, fuel may be delivered by a single stage fuel pump at lower pressure. Further, while not shown, the fuel tank may have a pressure transducer providing a signal to controller 12.

It will be appreciated that in an alternate embodiment, injector 166 may be a port injector providing fuel into the intake port upstream of cylinder 30. It will also be appreciated that cylinder 30 may receive fuel from a plurality of injectors, such as a plurality of port injectors, a plurality of direct injectors, or a combination thereof.

Controller 12 is shown in FIG. 2 as a microcomputer, including microprocessor 106, input/output ports 108, an electronic storage medium for executable programs and calibration values shown as read-only memory 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type, such as a crankshaft position sensor) coupled to crankshaft 140; throttle position (TP) from a throttle position sensor (not shown); and absolute manifold pressure signal (MAP) from sensor 124. Engine speed signal, RPM, may be generated by controller 12 from signal PIP (or the crankshaft position sensor). Manifold pressure signal MAP from a manifold pressure sensor may be used to provide an indication of vacuum, or pressure, in the intake manifold. Storage medium read-only memory 110 can be programmed with computer readable data representing instructions executable by microprocessor 106 for performing the methods described below as well as other variants that are anticipated but not specifically listed.

An exhaust gas recirculation (EGR) system (as illustrated in FIG. 1) may route a desired portion of exhaust gas from exhaust passage 148 to intake passage 144 via an EGR passage (not shown). The amount of EGR provided to the intake may be varied by controller 12 via an EGR valve (not shown). Further, an EGR sensor (not shown) may be arranged within the EGR passage and may provide an indication of one or more pressure, temperature, and concentration of the exhaust gas. Under some conditions, the EGR system may be used to reduce NO formation of combustion by reducing peak combustion temperatures, increase combustion efficiency by mitigating knock and reducing heat losses, reducing "enrichment" requirements and reducing pumping work.

As described above, FIG. 2 shows only one cylinder of a multi-cylinder engine. As such each cylinder may similarly include its own set of intake/exhaust valves, fuel injector(s), spark plug, etc.

Now turning to FIGS. 3-5, FIG. 3 shows an example embodiment of exhaust treatment system 22 in a first mode of operation (Mode A) with the integrated exhaust valve system in a first configuration, FIG. 4 depicts a second mode of operation (Mode B) with the integrated exhaust valve system in a second configuration, and FIG. 5 depicts a third mode of operation (Mode C) with the integrated exhaust valve system in a third configuration. It will be appreciated that like numbered components introduced in FIG. 3 may be referenced similarly in FIGS. 4-5.

Returning to FIG. 3, it shows an example embodiment 300 of exhaust treatment system 22. The engine exhaust treatment system includes a first conduit 145 coupled to the engine exhaust at a first end and coupled to an exhaust tailpipe 35 at a second end. The exhaust treatment system may further include a second conduit 245 disposed parallel to the first conduit with a first end of the second conduit coupled to the first end of the first conduit and a second end of the second conduit coupled to the second end of the second conduit, upstream of exhaust tailpipe 35. First conduit 145 may be configured to receive exhaust gas from an emission control device before venting the exhaust to the atmosphere through tailpipe 35. Exhaust throttle valve 302 may be positioned in first conduit 145 to enable exhaust throttling and control of flow and pressure of exhaust gases in the conduit. Isolation valve 304 may be positioned in second conduit 245. In one example, isolation valve 304 may be a ball valve.

In the fully closed position, exhaust throttle valve 302 may drive substantially all the exhaust gas received from the emission control device into second conduit 245, via connecting conduit 273. Second conduit 245 may include one or more HC traps 320, upstream of isolation valve 304, for retaining emission HCs.

HC trap 320 may be, for example, in the form of a brick or monolith comprising a base substrate layered with one or more appropriate HC adsorbents. In another example, HC trap 320 may be in the form of an extruded monolith. Alternatively, HC trap 320 may include pellets of an appropriate adsorbent. HC trap adsorbents may be selected such that a maximum amount of HCs may be adsorbed during HC storing while allowing maximum desorption of HCs during HC purging at a low enough temperature without aging the trap. The selected adsorbents may also have high durability to prevent deterioration due to heat or poisoning from the exhaust gas. For example, the HC traps may include at least one of activated carbon and zeolites (e.g., catalyzed or un-catalyzed zeolites). In one example, the zeolites may include a high silica zeolite (that is, un-catalyzed) with scarce acid sites that may not substantially coke under the exhaust treatment conditions. In another example, the zeolites may include an appropriate amount and nature of catalyst to limit an amount of coke formation and poisoning under the exhaust treatment conditions. In yet another example, rare earth oxides may be impregnated into the zeolites to reduce coking and poisoning.

The adsorbent may be selected based on a range of trap inlet temperatures desired or anticipated. For example, an activated carbon-based HC trap may be used for lower inlet temperatures (for example, not exceeding 350° C.), while a zeolite-based trap may be used for higher inlet temperatures (for example, up to 600° C.).

EGR passage 373, communicating with air induction system 43, may be coupled to the first end of second conduit 245 via an optional HC trap bypass valve 306. EGR passage 373 may be further coupled to the second end of second conduit 245, upstream of isolation valve 304, via a third conduit 312 and an EGR valve 308. Herein, connecting conduit 373 may substantially extend into EGR passage 373. In one example, EGR valve 308 may be a dedicated EGR shut-off valve. In another example, EGR valve 308 may be a common EGR valve, such as LP-EGR valve 39 (FIG. 1). Under selected conditions, an EGR purge flow may be used to purge stored HCs from HC trap 320 into air induction system 43, upstream of compressor 52. Under other conditions, an EGR flow may be recirculated to air induction system 43 while bypassing HC trap 320. As further elaborated herein, by adjusting and coordinating the opening of HC trap bypass valve 306 and isolation valve 304, positioned upstream and downstream of HC trap 320 respectively, an amount of EGR flow through the HC trap may be adjusted.

It will be appreciated that the inclusion of optional HC trap bypass valve 306 may be dependent on the temperature limitation of HC trap 320 and/or the temperature of the EGR flow. As such, a higher temperature limitation may be achieved when the HC trap includes catalyzed zeolites (for example, 500° C.) as compared to activated carbon (for example, 300° C.).

In one example, as further elaborated in FIG. 6, exhaust throttle valve 302 and isolation valve 304 may be integrated into an exhaust valve system, such as a dual bore exhaust valve system. The isolation ball valve and the throttle valve may be mounted on a common shaft operated by a common actuator. Further, the opening of one valve may be coordinated with the closing of the other valve. In one example, as elaborated herein, the actuator may be adjusted such that exhaust flow may be routed though the isolation valve while the throttle valve is closed. In another example, the actuator may be adjusted such that exhaust flow may be routed through the throttle valve with the isolation valve closed. Further, with the isolation valve closed, the position of the shaft may be adjusted to vary an amount of flow through the throttle valve with the isolation valve still closed. In this way, by integrating the valves, a wide range of exhaust throttle valve opening angles may be enabled, while isolation valve 304 remains closed, to thereby adjust a direction and amount of exhaust flow through the exhaust treatment and EGR systems. In alternate examples, exhaust throttle valve 302 and isolation valve 304 may be actuated independently by dedicated actuators.

Exhaust treatment system 22 may be operated by a controller in a plurality of modes by selective adjustment of the various valves. For example, the following operating modes may be performed:
MODE A: Exhaust HC storage
MODE B: HC Trap purge
MODE C: EGR only
MODE I: Trap isolation The configuration of the various valves of exhaust treatment system 22 in the various operating modes is detailed herein and summarized in the table of FIG. 9.

Returning to FIG. 3, it shows an example configuration of the various valves of exhaust treatment system 22 in a first operating mode (Mode A, exhaust HC storage) with the integrated valve system, including exhaust throttle valve 302 and isolation ball valve 304, in a first configuration. During select engine and/or vehicle operating conditions, such as during an engine cold start condition (for example, when the engine and/or a catalytic converter is below a light-off temperature), controller 12 may adjust the common actuator to a first position to close exhaust throttle valve 302 (for example, fully close) while opening isolation valve 304. Additionally, controller 12 may close HC trap bypass valve 306 and close EGR valve 308. In this valve configuration, exhaust gas from the engine may be routed to the tailpipe via second conduit 245. Specifically, exhaust gas may flow through HC trap 320 of second conduit 245 before being vented to the atmosphere via tailpipe 35. As such, in this configuration, the EGR system may be bypassed. In this way, untreated exhaust hydrocarbons emitted from an inactive catalytic converter may be substantially removed from the exhaust before venting to the atmosphere. During the storing operation, a temperature sensor (for example, exhaust temperature sensor 128) may be used to determine a temperature of the exhaust and/or infer a temperature of the emission control device and accordingly adjust the duration of each mode and/or a transition between modes. Thus, the first operating mode (Mode A) enables storing of cold start emission hydrocarbons in the HC trap of exhaust treatment system 22.

FIG. 4 shows an example configuration 400 of the various valves of exhaust treatment system 22 in a second operating mode (Mode B, trap purging) with the integrated valve system, including exhaust throttle valve 302 and isolation ball valve 304, in a second configuration. During select engine and/or vehicle operating conditions, such as after a catalyst light-off temperature and EGR-conducive exhaust temperatures have been reached, controller 12 may adjust the common actuator to a second position to close isolation valve 304 while opening exhaust throttle valve 302 by a first, smaller amount. Alternatively, controller 12 may adjust the common actuator to a third position to close isolation valve 304 while opening exhaust throttle valve 302 by a second, larger amount. As such, when in the second or third position, at least some exhaust gas may be directed to the engine intake via the EGR passage. In the second operating mode, with the actuator in the second position (as depicted), or in the third position, the controller 12 may additionally open EGR valve 308 while closing HC trap bypass valve 306 to direct at least some exhaust gas to EGR passage 373 through HC trap 320 and third conduit 312. Specifically, at least a portion of warmed-up exhaust gas may be diverted into second conduit 245 to purge HC trap 320. The EGR purge flow may then be recirculated to air induction system 43 along EGR passage 373.

As such, the amount and flow rate of EGR flow used to purge the stored HCs may be controlled, at least in part, by adjusting the amount of opening of exhaust throttle valve 302. Thus, in one example, when a larger EGR purge flow is desired, the integrated valve system may be adjusted into the second position with the throttle valve open by the first amount to decrease flow through the throttle valve (and to the exhaust tailpipe) while increasing the flow directed towards the EGR passage. In another example, when a smaller EGR purge flow is desired, the integrated valve system may be adjusted into the third position with the throttle valve open by the second, larger amount to increase flow through the throttle valve (and to the exhaust tailpipe) while decreasing the flow directed towards the EGR passage.

In yet another example, the engine controller may adjust the actuator position based on a desired trap inlet temperature. The trap inlet temperature may be estimated by a dedicated temperature sensor, or may be inferred from the exhaust gas temperature as estimated by temperature sensor 128.

In one embodiment, the EGR purge flow through the exhaust treatment system may operate in parallel to an existing EGR operation, for example, an existing internal or external EGR operation. In this case, the existing EGR may be compensated for the EGR purge flow. For example, the maximum available EGR purge flow rate may be subtracted from the desired EGR rate, thereby reducing the amount of existing EGR.

In this way, second operating mode (Mode B) enables stored HCs from the trap assembly to be purged into, and be combusted by, the engine. Specifically, in the second operating mode, exhaust gas may be routed through the trap assembly of the exhaust treatment system and then the LP-EGR system before being diverted to the air induction system. That is, a purge flow may also be used as an EGR flow. By directing the purge flow into the air induction system as a cooled EGR flow, the second operating mode enables synergies to be achieved between the exhaust treatment system and the LP-EGR system. Additionally, the above-mentioned configuration of valves enables storing and purging to occur with gas flow in a single direction. Thus, a reverse flow of gas during the purging operation (versus the storing operation), and related additional conduit and valve configurations, are not necessitated.

FIG. 5 shows an example configuration 500 of the various valves of exhaust treatment system 22 in a third mode of operation (Mode C, EGR only) with the integrated valve system, including exhaust throttle valve 302 and isolation ball valve 304, in a third configuration. During select engine and/or vehicle operating conditions, such as after successful completion of a HC trap purging operation and/or when only EGR is desired, controller 12 may adjust the common actuator to a second position to close isolation valve 304 while opening exhaust throttle valve 302 by a first, smaller amount or a third position (as depicted) to close isolation valve 304 while opening exhaust throttle valve 302 by a second, larger amount. When in the second or third position, at least some exhaust gas may be directed to the engine intake via the EGR passage. In the third operating mode, with the actuator in the third position (as depicted), or in the second position, the controller 12 may additionally open HC trap bypass valve 306 and EGR valve 308. In this configuration, at least a portion of exhaust gases may be diverted into the engine while bypassing HC trap 320 and third conduit 312. Specifically, exhaust from the engine may be routed to the engine intake along conduit 273 and EGR passage 373 while HC trap 320 remains isolated from the EGR exhaust flow.

Herein, as in the second mode, an amount and flow rate of EGR flow may be controlled, at least in part, by adjusting the amount of opening of exhaust throttle valve 302. Thus, in one example, when a larger EGR flow is desired, the integrated valve system may be adjusted into the second position with the throttle valve open by the first amount to decrease flow through the throttle valve (and to the exhaust tailpipe) while increasing the flow directed towards the EGR passage. In another example, when a smaller EGR flow is desired, the integrated valve system may be adjusted into the third position with the throttle valve open by the second, larger amount to increase flow through the throttle valve (and to the exhaust tailpipe) while decreasing the flow directed towards the EGR passage.

In this way, by routing exhaust gas through the EGR system while bypassing the HC trap of the exhaust treatment system, the third operating mode enables an EGR operation to be performed independent of an exhaust treatment operation. Additionally, by not routing exhaust through the HC trap in this operating mode, the HC trap may be cooled below a threshold temperature (such as, below 100° C.) to enable capture of HC emissions in case of a breakthrough event. For example, if a sudden breakthrough event occurs, or if a breakthrough event is predicted (for example, during a lean NOx trap rich regeneration), by cooling the HC trap during the third operating mode, the exhaust treatment system may be rapidly shifted to the first operating mode in response to the breakthrough event, to store the breakthrough HCs. In this way, HCs released during sudden breakthrough events may be captured in addition to cold start emissions, thereby improving the quality of exhaust emissions.

In one example, a controller may transition the exhaust treatment system between the first and second modes directly, in response to the change in operating conditions. In another example, the exhaust treatment system may be transitioned from the first operating mode to the second operating mode via an intermediate mode (Mode I) wherein the trap is isolated. During select engine and/or vehicle operating conditions, such as a first intermediate condition following the engine cold start condition and preceding a purging condition, including after a catalyst light-off temperature has been reached, but before EGR-conducive exhaust temperatures are reached, the engine controller may adjust the actuator to the second or third position to open exhaust throttle valve 302 while closing isolation valve 304. Additionally, controller 12 may close HC trap bypass valve 306 and EGR valve 308. In this configuration, exhaust gases may be routed along first conduit 145 and vented to the atmosphere through tailpipe 35, after treatment by the active emission control device, while bypassing the HC trap and the EGR passage. Thus, HC trap 320 may be isolated from the exhaust gas and the EGR system, and the retained HCs may remain stored in the HC trap with limited slip. In this way, the intermediate operating mode enables intermediate cold engine operation and defers purging of the stored HCs until a desired exhaust temperature (for example, an engine temperature favoring EGR) is attained.

Similarly, a controller may transition the exhaust treatment system between the second and third modes directly, or via the intermediate mode (Mode I). During select engine and/or vehicle operating conditions, such as a second intermediate condition following the purging condition and preceding an EGR condition, including conditions when exhaust temperatures are above a threshold temperature (for example, a temperature above which the exhaust may deteriorate the trap assembly material, such as above 400° C.), at engine idle speed, and/or when no EGR is desired, controller 12 may adjust the actuator to the second or third position to open exhaust throttle valve 302 while closing isolation valve 304, while closing HC trap bypass valve 306 and EGR valve 308. In this configuration, exhaust gases may again be vented to the atmosphere along first conduit and HC trap 320 may be isolated from hot lean exhaust. In this way, the intermediate operating mode enables intermediate idle engine operation and reduces trap degradation (such as trapping materials, trap filters, trap support structures, etc.) by the heated exhaust.

FIGS. 6A-K depict various isometric, front-end and cross-sectional views of an example integrated exhaust valve system, in various configurations of the included throttle valve and isolation valve. In the depicted embodiment, the isolation valve is a ball valve. As such, the depicted integrated exhaust valve system may be used in the exhaust treatment system of FIG. 3. It will be appreciated that elements of the valve system introduced in FIG. 6A may be similarly referenced in FIGS. 6B-K.

Returning to FIG. 6A, integrated exhaust valve system 600 includes a first throttle valve 602 and a second isolation valve 604 coupled via a common shaft 606. The design of the integrated exhaust valve system allows a common actuator (not shown) to operate the two valves, thereby providing component reduction. Operation of the actuator may change a position of the common shaft, to thereby adjust the opening and closing of each of the coupled valves. In one example, as depicted, integrated valve system 600 may be a dual bore exhaust valve system with throttle valve 602, positioned in first bore 616, and isolation valve 604, positioned in second bore 626, mounted on common shaft 606.

First bore 616 may house throttle plate 608 of throttle valve 602 within first bore inner wall 610. By adjusting the position of common shaft 606, throttle plate 608 may be moved between a fully closed position and a fully open position to thereby adjust a flow of exhaust through the throttle valve along a passage 630 defined by the first bore inner wall 610. Isolation valve 604 may be configured as a ball valve with a ball 612 including an inner tunnel 614. The ball 612 may be housed in second bore 626. Rotation of the common shaft may cause ball 612 to correspondingly rotate within second bore inner wall 620. As such, isolation valve 604 may allow flow there-through only when inner tunnel 614 of ball 612 is aligned with the outer bore holes of second bore 626 (as shown in FIGS. 6D-E) at a desired actuator position.

While the depicted example shows the isolation valve as a ball valve, it will be appreciated that various options may be used at second bore 626. In one alternate embodiment, the isolation valve may be configured with an inner shaft cylinder housed inside the second bore 626. The inner shaft cylinder may have an inner tunnel that allows flow there-through only when the inner tunnel is aligned with the outer bore holes at a desired actuator position. Thus, the inner tunnel defined by the ball or cylinder of the isolation valve may define a path for exhaust flow through the isolation valve. In some embodiments, the inner ball or cylinder may be sealed in the second bore by a cover (not shown).

By integrating a throttle valve and a ball valve along a commonly actuated shaft, multiple angles of movement of the throttle plate may be achieved in first bore 616 without affecting a flow of exhaust through second bore 626. Specifically, as further elaborated herein, the throttle position may be adjusted between a wide range of open positions while the isolation valve remains closed.

Figure 6A:
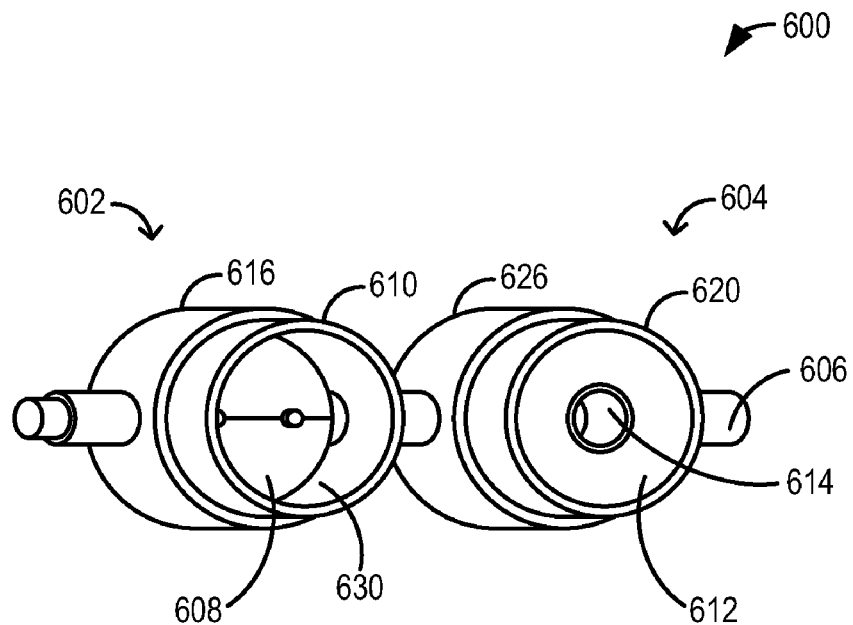
FIGS. 6A-K show different views of a throttle valve and an isolation valve of the integrated exhaust valve system of FIGS. 3-5.
Figure 6B:
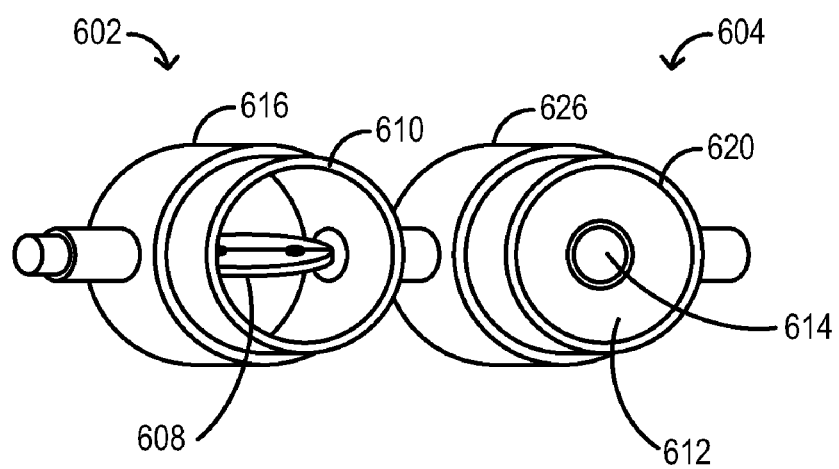

FIG. 6A shows an isometric view of integrated valve system 600 in a first configuration with throttle valve 602 fully closed and isolation valve 604 fully open. In comparison, FIG. 6B shows an isometric view of the valve system in a second configuration with throttle valve 602 fully open (as depicted with throttle plate 608 substantially perpendicular to the plane of first bore 616) and isolation ball valve fully closed (as depicted with inner tunnel 614 sealed off).

Figure 6C:
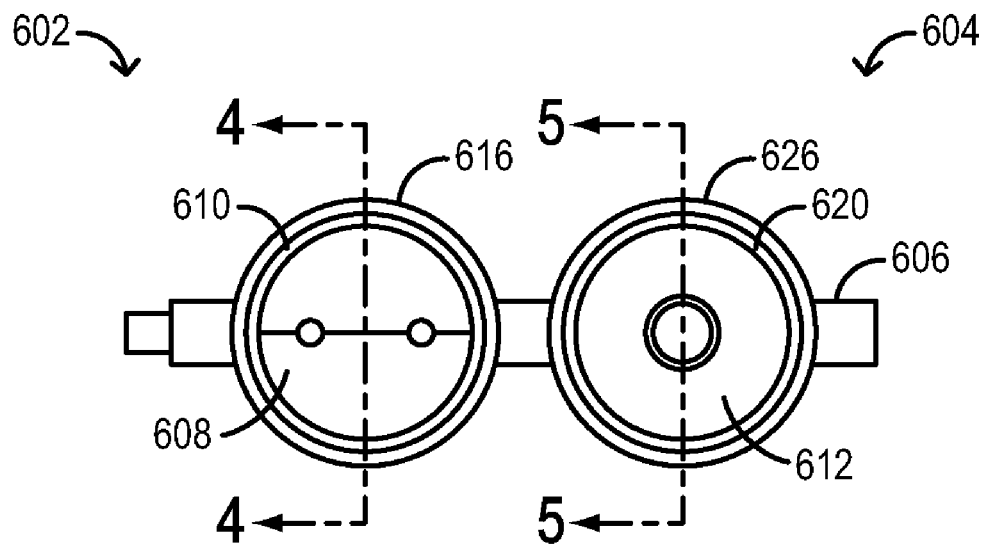
Figure 6D:
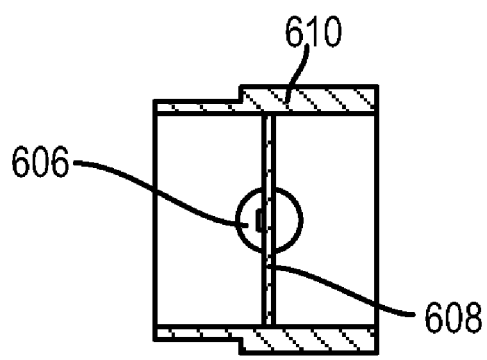
Figure 6E:
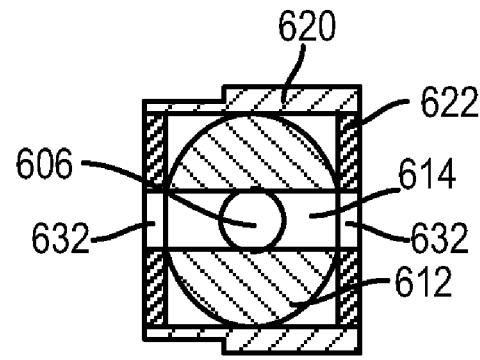

FIG. 6C shows a front-end view of integrated valve system 600 in the first configuration. Herein, the common actuator may have been operated to adjust the common shaft to a first position that situates the first throttle valve 602 closed (e.g., fully closed) and the second isolation valve 604 open (e.g., fully open). When fully closed, throttle plate 608 may be aligned with first bore inner wall 610 such that the passage defined by the inner wall is substantially sealed off. In one example, by adjusting the common shaft to move the throttle plate 608 to the fully closed position, a leakage rate around throttle plate 608 may be reduced to the range of 0-10 ft$^3$/hr at 2 bar pressure.

FIG. 6D shows a cross-sectional view of the throttle valve of FIG. 6C along plane 4-4. FIG. 6E shows a corresponding cross-sectional view of the isolation valve of FIG. 6C along plane 5-5. As shown in FIG. 6D, when fully closed, throttle plate 608 may be substantially perpendicular to the pivoting plane of common shaft 606. Additionally, throttle plate 608 may be aligned along first bore inner wall 610 such that substantially no exhaust flow may leak around the throttle plate. At the same time, while closing throttle valve, common shaft 606 may rotate ball 612 of the isolation valve (FIG. 6E) to fully open the valve. As shown, in the full open configuration, inner tunnel 614 may be substantially aligned with the outer bore holes 632 of second bore 626. A rubber gasket 622 may be provided in the space between the outer bore holes and the second bore inner wall.

In one example, during a first condition, including exhaust HC storing conditions, an engine controller may be configured to adjust the actuator to operate the integrated valve system in the first position. As such, the integrated valve system may be incorporated into an exhaust treatment system such that the first throttle valve is positioned in a first conduit communicating with an exhaust tailpipe, and the second isolation valve is positioned in a second conduit, downstream of a HC trap, the second conduit parallel to the first conduit. During the HC storing condition, the controller may additionally close an EGR valve and an inlet canister valve of the exhaust treatment system. By adjusting the integrated valve system to the first position, and coordinating the operation of the other exhaust treatment system valves, exhaust gas may be diverted away from the first conduit and may flow through the HC trap of the second conduit before being vented to the atmosphere via the tailpipe.

Figure 6F:
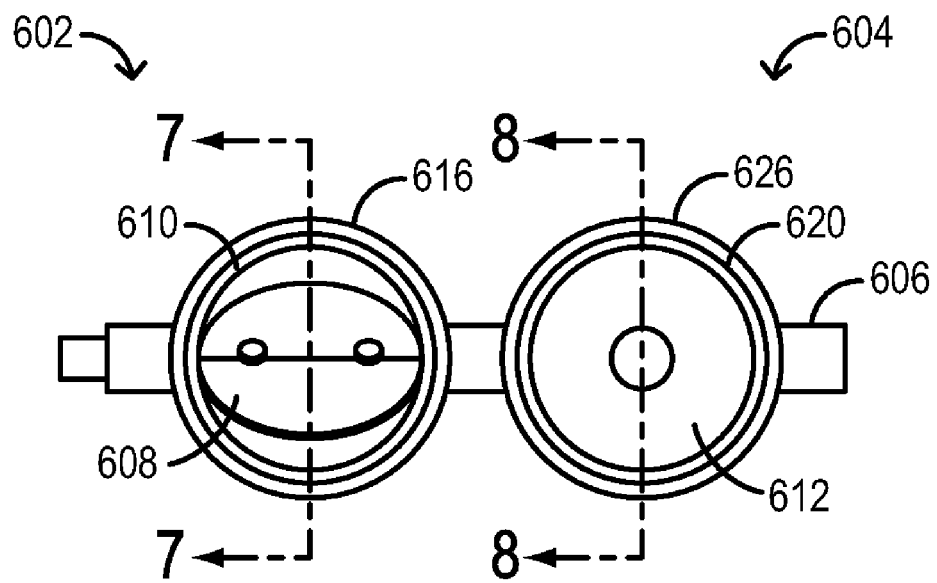

FIG. 6F shows a front-end view of integrated valve system 600 in a second configuration. Herein, the common actuator may be operated to adjust the common shaft to a second position that situates the second isolation valve 604 closed (e.g., fully closed) and the first throttle valve 602 open by a first amount. When open by a first amount, throttle plate 608 may be aligned at a first angle with first bore inner wall 610 such that the passage defined by the inner wall is partly open (e.g., by a first amount) and such that a first amount of exhaust flow may flow through the throttle valve.

Figure 6G:
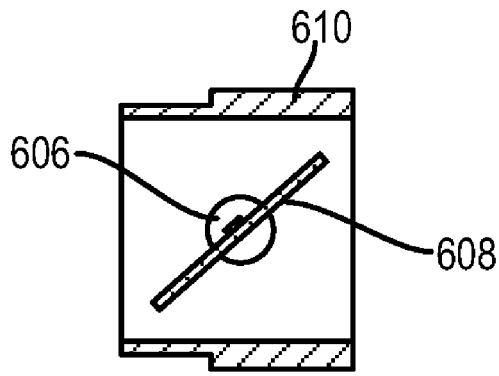
Figure 6H:
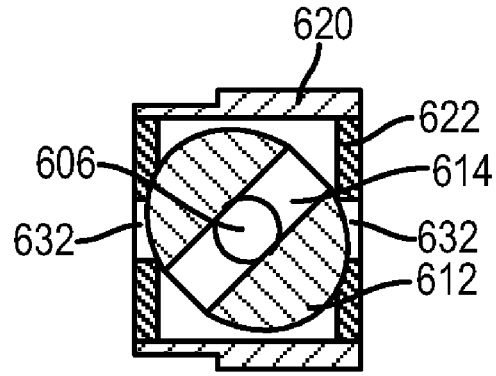

FIG. 6G shows a cross-sectional view of the throttle valve of FIG. 6F along plane 7-7. FIG. 6H shows a corresponding cross-sectional view of the isolation valve of FIG. 6F along plane 8-8. As shown in FIG. 6G, when open by a first amount, throttle plate 608 may be offset by a first angle to the pivoting plane of common shaft 606, and first bore inner wall 610, such that a first amount of exhaust may flow around the throttle plate. At the same time, while opening the throttle valve by the first amount, common shaft 606 may rotate ball 612 of the isolation valve (FIG. 6F) to offset inner tunnel 614, by the same first angle, from outer bore holes 632 of second bore 626. In this way, the same rotation of the shaft may enable the throttle valve to be opened to enable exhaust to flow therethrough while closing flow through the isolation valve.

Figure 6I:
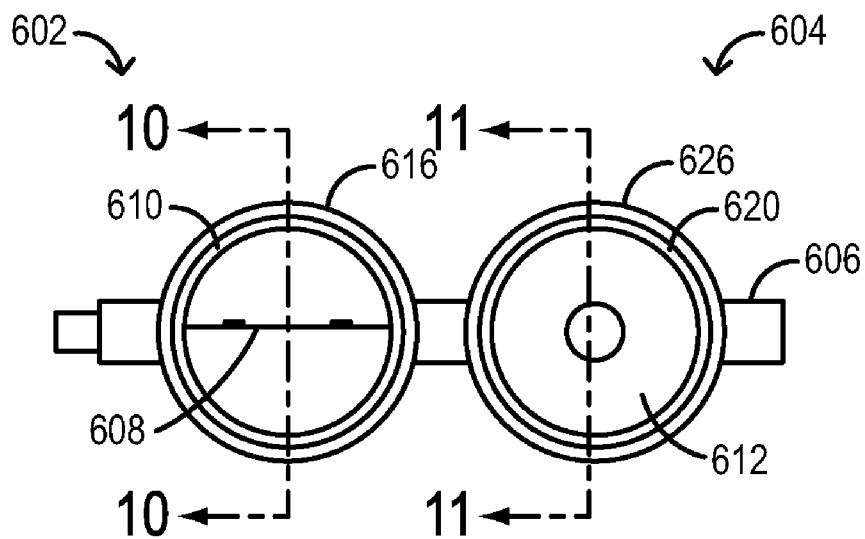

FIG. 6I shows a front-end view of integrated valve system 600 in a third configuration. Herein, the common actuator may be operated to adjust the common shaft to a third position that situates the second isolation valve 604 still closed and the first throttle valve 602 open by a second, larger amount. When open by a second amount, throttle plate 608 may be aligned at a second, larger angle with first bore inner wall 610 such that the passage defined by the inner wall is at least partly open (e.g., by a second, larger amount) and such that a second, larger amount of exhaust may flow through the throttle valve. In one example, as depicted, the second angle may be such that throttle plate 608 is substantially parallel to the plane of the common shaft, and throttle valve 602 is fully open.

Figure 6J:
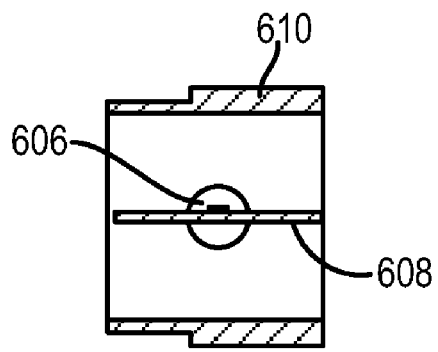
Figure 6K:
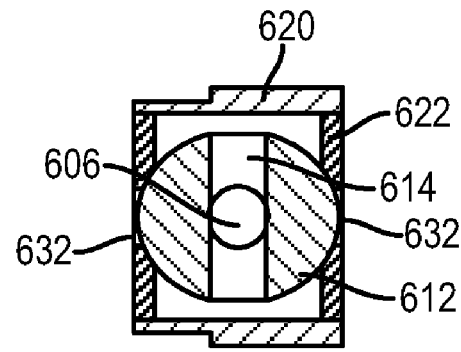

FIG. 6J shows a cross-sectional view of the throttle valve of FIG. 6I along plane 10-10. FIG. 6K shows a corresponding cross-sectional view of the isolation valve of FIG. 6I along plane 11-11. As shown in FIG. 6J, when open by a second amount, throttle plate 608 may be offset by a second, larger angle to the pivoting plane of common shaft 606, and first bore inner wall 610, such that a second, larger amount of exhaust may flow around the throttle plate. In one example, as depicted, the second larger angle may be a 180° angle with the plane of the common shaft, such that throttle valve is substantially fully open. At the same time, while opening the throttle valve by the second amount, common shaft 606 may rotate ball 612 of the isolation valve to offset inner tunnel 614, by the same second angle, from outer bore holes 632 of second bore 626. Thus, in this example, the same position of the common shaft that aligns the throttle plate parallel to the plane of the shaft, may align the inner tunnel 614 of ball 612 perpendicular to the plane of the outer bore holes 632. As a result, flow through the outer bore holes of the isolation valve may remain blocked. Thus, in the depicted example, the same rotation of the shaft may enable the throttle valve to be fully opened to enable exhaust to flow there-through while fully closing flow through the isolation valve.

In one example, during either a second condition, including exhaust HC purging conditions, or a third condition, including EGR conditions, an engine controller may be configured to adjust the actuator to operate the integrated valve system in one of the second or third position. In either the second or third position, the integrated valve system may be configured to direct at least some exhaust gas to an engine intake via an air induction system. For example, during the HC purging condition, in addition to adjusting the integrated valve system to the second or third position, the engine controller may open the EGR valve and close the inlet canister valve of the exhaust treatment system. In this way, at least some exhaust gas may flow to the engine intake along a third conduit via the HC trap of the second conduit. In another example, during the EGR condition, the controller may additionally open the EGR valve and the inlet canister valve of the exhaust treatment system. In this way, at least some exhaust gas may flow to the engine intake while bypassing the third conduit and the HC trap of the second conduit. By adjusting the first or second amount of throttle opening, the characteristics of the EGR purge flow through the exhaust treatment system may be adjusted. In one example, the first and/or second amount may be adjusted based on a desired EGR flow rate, a desired EGR temperature, a desired EGR air-fuel ratio, etc. Additionally, during conditions when engine vacuum or differential pressure conditions when boosted are less than desired for an EGR flow, the opening of the exhaust throttle valve may be adjusted to achieve sufficient exhaust backpressure and to push engine exhaust gas through an EGR system.

In this way, an integrated valve system including a first throttle valve coupled to a second ball valve along a commonly actuated shaft may provide a wide range of operating configurations for the valves without requiring additional actuators. By incorporating such an integrated valve system into an exhaust treatment system, exhaust treatment operations may be coupled to an EGR system to achieve advantageous synergies without increasing component cost or complexity.

It will be appreciated that while the depicted example indicates a common actuator, in alternate embodiments, each valve may be operated by a dedicated actuator. In still another example, the integrated exhaust valve system may include a staged actuator wherein exhaust throttle valve 602 and the isolation valve 604 are each driven by a cam. In this configuration, the secondary throttle plate may be connected to the primary throttle via a rod and a slotted lever so that the secondary throttle plate may not be able to move until the rod hits the end of the slot. Alternatively, the levers that can rotate within limits on the actuator shaft may be used.

Further, while the depicted example illustrates the isolation valve as a ball valve coupled to a throttle valve, in alternate embodiments, the integrated valve system may be a modified dual bore butterfly valve system wherein one valve is allowed to move when the other valve is not allowed to move. Here, the exhaust throttle valve may be a dual bore integrated throttle valve system with a throttle valve plate and an isolation valve plate driven on concentric drive shafts. The throttle valve plate may be configured to travel 180 degrees. About 90 degrees of that travel may be used to rotate and operate the throttle valve (non-redundant operating angle region) while the remaining redundant about 90 degrees of travel (redundant operating angle region) may be used to open the isolation valve plate. In one example, the isolation plate may be kept closed using missing gear teeth or different gear ratios on the drive shaft.

An actuator may move the throttle plate shaft in 180 degrees of travel. When operating in the non-redundant operating region of the throttle plate (e.g., 0-90 degrees), only the throttle plate shaft may rotate. In this region, the throttle plate may be opened by varying degrees while the isolation valve plate remains closed. Beyond that region, the throttle plate shaft may impinge on and rotate the isolation valve plate shaft, allowing the isolation valve shaft to rotate and operate in the redundant operating region of the throttle plate (e.g., 90-180 degrees). In this region, the isolation valve plate may be opened by varying degrees while the throttle valve remains closed. The isolation valve may include a spring near the actuator arm to maintain closure when not impinged upon.

In still other embodiments, alternate valve configurations may be used to enable one valve to remain closed while the other is opened through varying degrees of opening. In this way, by increasing the freedom of movement of the exhaust throttle valve, flow adjustments (for example, direction of flow and rate of flow) through the exhaust treatment system may be improved.

FIG. 8 depicts a map 800 of valve opening for the integrated valve system of FIGS. 6A-K at different actuator positions. Specifically, map 800 depicts the opening of isolation ball valve (604 of FIG. 6A) at graph 802 (dashed line) and a corresponding position of the coupled throttle valve (602 of FIG. 6A) at graph 804 (dotted line) at different actuator positions. As such, each valve may be operated in a range of positions between a fully open configuration and a fully closed configuration (y-axis) based on the actuator position (x-axis). Further, the throttle valve and the ball valve may be configured such that the opening of one valve is coupled to the closing of the other valve.

Thus, for example, when the actuator is positioned between positions $P_1$ and $P_2$, the ball valve may be fully closed while the exhaust throttle valve is at least partially open. Specifically, as the actuator position is changed from $P_1$ to $P_2$, the common shaft may rotate to gradually decrease the opening of the throttle valve. At the same time, the common shaft may rotate the inner ball of the ball valve in a range of positions wherein the inner ball may remain unaligned with the bore outer tunnel. Consequently, for the same range of positions, the throttle valve may have a range of openings while the ball valve remains closed.

Similarly, when the actuator is positioned between positions $P_3$ and $P_4$, the throttle valve may be fully closed while the isolation valve is at least partially open. Specifically, as the actuator position is changed from $P_3$ to $P_4$, the common shaft may rotate to gradually decrease the opening of the ball valve. At the same time, due to the configuration of the throttle plates, the rotation of the common shaft may keep the throttle valve closed. Consequently, for the same range of positions, the ball valve may have a range of openings while the throttle valve remains closed.

In one example, the actuator position may be varied by a controller based on a desired operating mode of the exhaust treatment system, and further based on the backpressure that may be provided by each valve in the desired operating mode. In one example, for backpressure control (such as may be desired during EGR only operations), the actuator may be positioned in position range 806 to provide the desired backpressure with the exhaust throttle valve partially open and the isolation valve closed. In another example, during HC storing conditions, to divert substantially all the exhaust gas through the HC trap, the actuator may be positioned in position range 808 with the exhaust throttle valve fully closed and the isolation valve partially open.

While the depicted example illustrates the valve system operated by a common actuator, it will be appreciated that in an alternate example, the integrated valve system may include staged actuators for each valve driven by independent cams. In this way, by integrating an exhaust throttle valve and an isolation ball valve into an exhaust valve system, a wide response pattern can be obtained.

Figure 7:
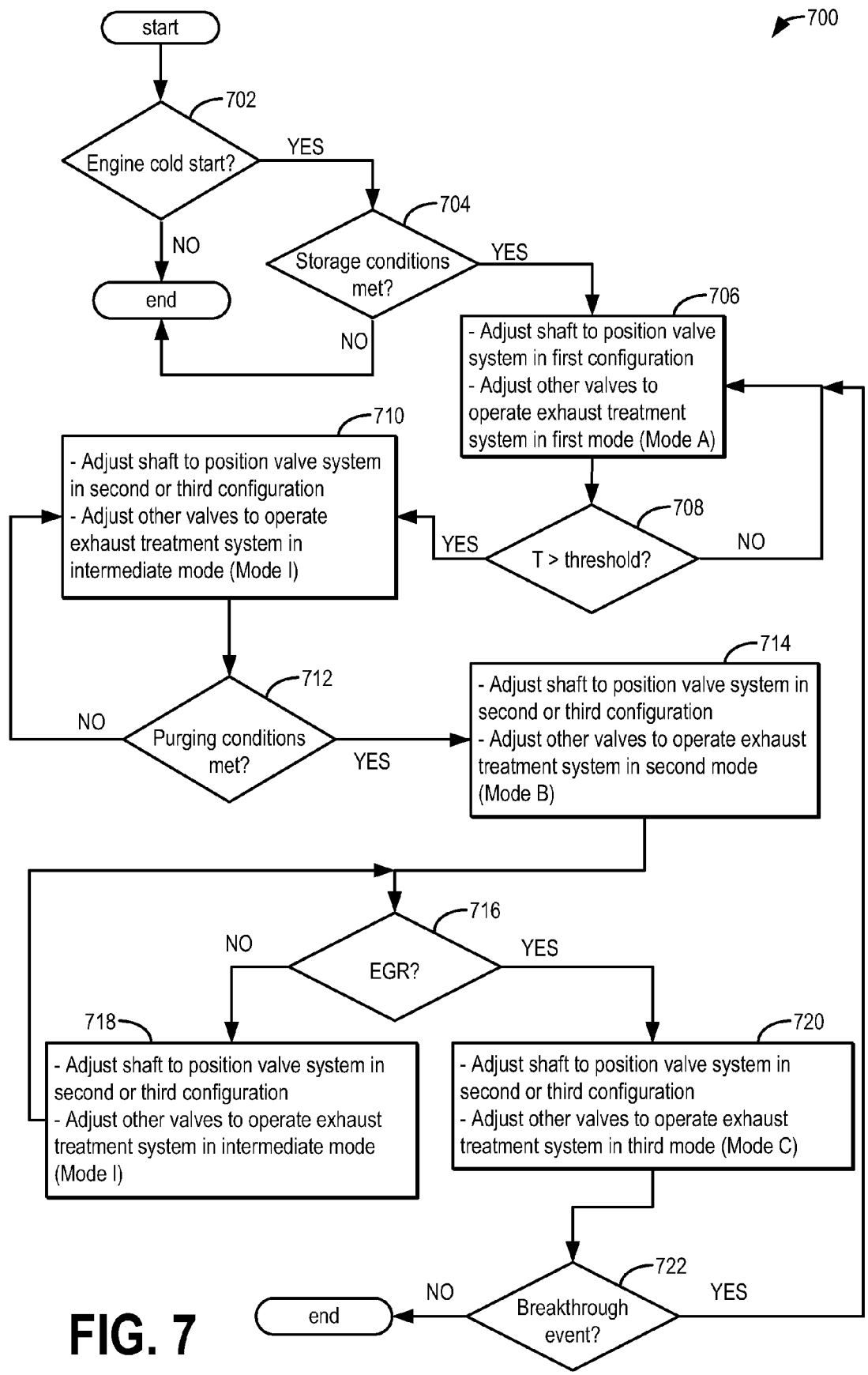
FIG. 7 shows a high level flow chart illustrating operation of the exhaust treatment system of FIG. 1, according to the present disclosure.
Figure 8:
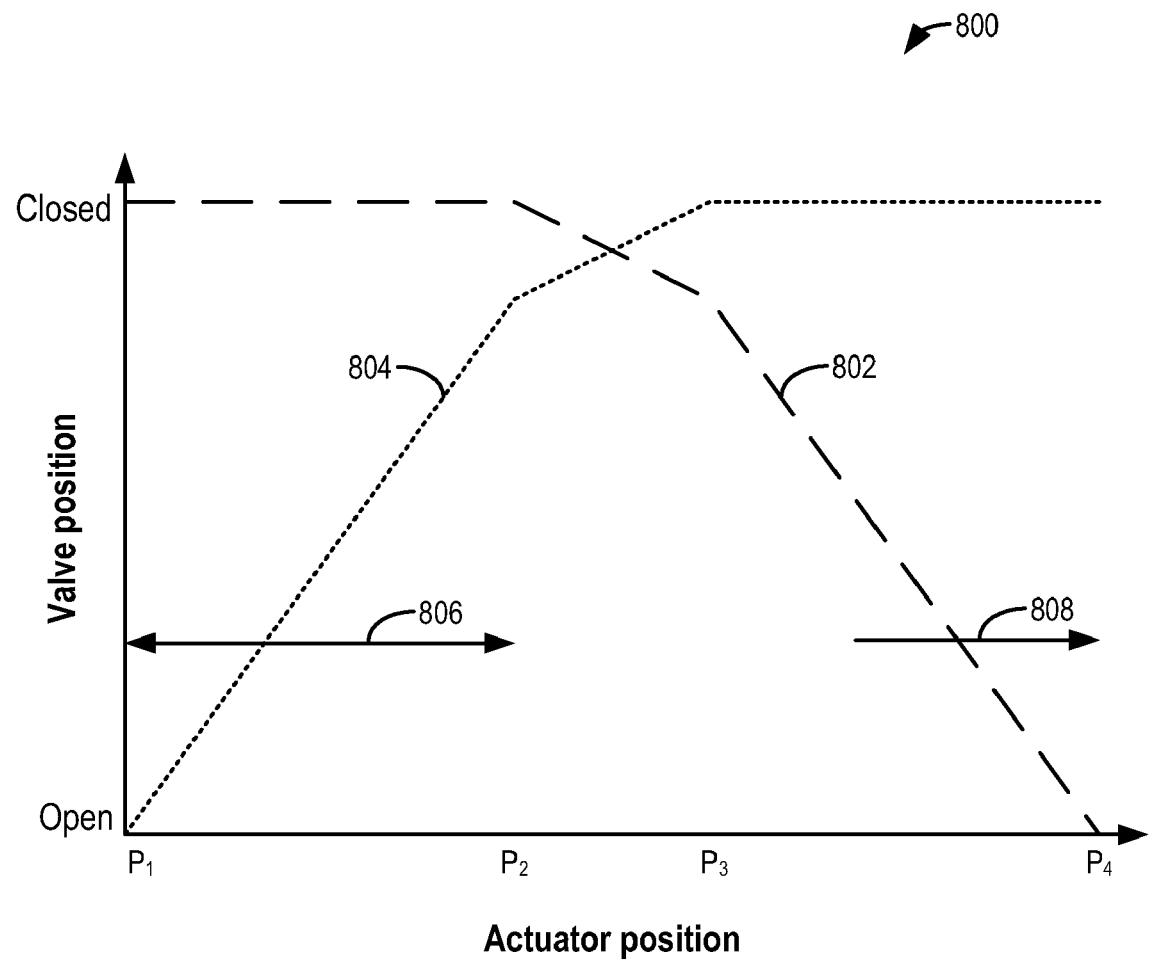
FIG. 8 shows a map of differences in exhaust throttle valve opening and isolation valve opening at various actuator positions in the exhaust valve system of FIG. 6.

Now turning to FIG. 7, an example routine 700 is shown for operating the exhaust treatment system of FIG. 1. Specifically, based on engine operating conditions, an engine controller may be configured to adjust the configuration of a variety of exhaust treatment system valves (as summarized in the table of FIG. 9) to thereby adjust an operating mode of the exhaust treatment system. As such, the exhaust treatment system may be operated in one of 4 operating modes including a storage mode, a purging mode, an EGR mode, and an intermediate mode. Additionally, the engine controller may operate a common actuator of an integrated valve system in the engine exhaust to position the commonly actuated shaft of the valve system in one of a first, second, or third configuration. Routine 700 may be implemented using systems, components, and devices described herein, but alternatively may be implemented using other suitable systems, components, and devices.

At 702, engine cold start conditions may be confirmed. This may include, for example, determining whether the engine is being started from rest and/or whether the engine has been started via an engine cranking operation. Further, an emission control device temperature may be estimated and/or inferred to confirm that it is below a threshold temperature (such as, a catalyst light-off temperature). In one example, the emission control device temperature may be estimated using a dedicated temperature sensor, such as a temperature sensor mounted to the emission control device. In another example, the temperature may be inferred from one or more exhaust gas temperature sensors located in the exhaust passage or exhaust manifold. In yet another example, the emission control device temperature may be inferred based on an engine off time (soak time), ambient temperature, engine coolant temperature, and intake air charge temperature. If cold start conditions are not confirmed, the routine may end.

At 704, HC storage conditions may be confirmed. In one example, storage conditions may be confirmed when the storage capacity of a HC trap of the exhaust treatment system is greater than a threshold value. In another example, storage conditions may be confirmed upon determination that the exhaust treatment system has been purged during a previous engine operation. Additionally, the routine may enable storage in the exhaust treatment system when the temperature of exhaust treatment system is less than a maximum storage temperature. Further still, storage of exhaust HCs may be enabled based on a fuel property of the fuel combusted in the engine. If storage conditions are not confirmed, the routine may end.

If storage conditions are confirmed, at 706, an actuator may be operated to position the integrated valve system (FIGS. 6A-K) in a first configuration with a first throttle valve closed and a second isolation valve open. Further, a controller may adjust the plurality of other valves to operate the exhaust treatment system in a first operating mode (Mode A, e.g., Exhaust HC storage). Specifically, an inlet canister valve and an EGR valve may be closed. In this configuration, exhaust gas may be diverted through a HC trap before being vented to the atmosphere along an exhaust tailpipe. In this way, exhaust HCs may be retained in the HC trap.

At 708, it may be determined whether the emission control device temperature is higher than a threshold temperature. In one example, the threshold temperature may correspond to an emission control device catalyst light-off temperature (that is, a temperature at which the catalyst may operate at high efficiency). If the emission control device temperature has not yet reached the threshold temperature, the exhaust treatment system may continue operating in the first mode. In this way, untreated HC emissions may be retained in a HC trap until exhaust catalytic converters are activated, thereby improving the quality of cold-start emissions.

If the threshold temperature is confirmed (that is, the emission control device has reached a temperature where it is catalytically active), at 710, the actuator may be operated to position the integrated valve system in either a second or third configuration with the second isolation valve closed and the throttle valve open by either a first, smaller amount or a second, larger amount. Further, the plurality of other valves may be adjusted to operate the exhaust treatment system in an intermediate operating mode (Mode I, e.g., Trap isolation). Specifically, the inlet canister valve and EGR valve may be closed. In this configuration, the HC trap may be isolated from the exhaust flow, allowing the treated exhaust to flow unobstructed through the exhaust passage and out of the tailpipe to the atmosphere. In this way, cleaned exhaust may be vented to the atmosphere while the engine warms up and/or until purging conditions are confirmed.

At 712, purging conditions may be confirmed. This may include confirming that an amount of HCs stored in the exhaust treatment system (such as the amount of HCs stored in the HC trap) is greater than a threshold, the temperature and/or pressure of the exhaust treatment system is above a threshold, a threshold the number of starts have passed since the last purge operation, etc. In one example, the amount of HCs stored in the HC trap may be determined based on an increase in the pressure of the HC trap (for example, as determined by a dedicated pressure sensor). In another example, the amount of HCs stored in the HC trap may be determined based on the reading of an exhaust gas sensor positioned downstream of the trap. In one example, purging conditions may be considered met if exhaust gases were previously routed through the HC trap during the current engine start. In another example, purging conditions may be considered met if the engine temperature has increased to meet EGR stability thresholds (that is, a threshold temperature above which EGR may be effective, such as above 400° C.). If purging conditions are not met, while the temperature of the emission control device remains above the threshold temperature, the routine may continue operating in the intermediate operating mode.

If purging conditions are confirmed, at 714, the actuator may be operated to position the integrated valve system in either the second or third configuration, with the second isolation valve closed and the throttle valve open by either a first, smaller amount or a second, larger amount. Further, the plurality of other valves may be adjusted to operate the exhaust treatment system in a second operating mode (Mode B, e.g., HC purging). Specifically, the inlet canister valve may be closed and EGR valve may be opened to route at least some exhaust gas to the engine intake (via the air induction system) through the HC trap. Thus, an EGR purge flow may be routed through the HC trap to purge the stored HCs to the engine intake and/or air induction system. The controller may select between the second or third configuration of the integrated valve system, and determine the first or second amount of throttle valve opening based on desired EGR flow characteristics (such as a desired EGR flow rate, a desired amount of EGR, etc.). In this way, a purge flow may also be used as an EGR flow, thereby providing fuel economy benefits. By sharing components between the exhaust treatment system and the EGR system, component reduction benefits may also be achieved.

While the depicted routine illustrates transitioning from the first operating mode to the second operating mode by operating in the intermediate mode, in alternate examples, the routine may transition from the first operating mode to the second operating mode without passing through the intermediate mode.

Following completion of the purging operation, at 716, it may be determined whether only EGR is desired. In one example, the purging operation may be considered complete when the amount of HCs stored in the HC trap, or a HC trap pressure, is lower than a threshold. In another example, the purging operation may be considered complete after a predetermined duration since the start of the purging operation has elapsed.

In one example, when no EGR is desired at 716, and the engine is at idle speeds and/or the exhaust temperature is above a threshold (for example, above 400° C.), at 718, the valves may be adjusted to operate the exhaust treatment system in the intermediate operating mode (Mode I, HC trap isolation). In this configuration, hot exhaust gas may be vented to the atmosphere following catalytic treatment through the emission control device while the HC trap is isolated from the potentially harsh effects of the heated exhaust flow.

In comparison, if EGR is desired at 716, for example following a successful purging operation, at 720, the actuator may be operated to position the integrated valve system in either the second or third configuration, with the second isolation valve closed and the throttle valve open by either a first, smaller amount or a second, larger amount. Further, the plurality of other valves may be adjusted to operate the exhaust treatment system in a third operating mode (Mode C, e.g., EGR only) to route at least some exhaust gas to the engine intake while bypassing the HC trap. Specifically, the inlet canister valve and the EGR valve may be opened. In this configuration, exhaust gas may be recirculated into the engine intake via an EGR passage. Further, HC trap may remain isolated from the EGR flow, thereby enabling an EGR operation to be performed independent of the exhaust treatment system. The controller may select between the second or third configuration of the integrated valve system, and determine the first or second amount of throttle valve opening based on a desired amount of EGR.

While the depicted routine illustrates transitioning from the second operating mode to the third operating mode via the intermediate mode, in alternate examples, the routine may transition from the second operating mode to the third operating mode without passing through an intermediate mode.

In this way, by coupling an exhaust treatment system with an EGR system, an EGR purge flow may be used to purge stored HCs to the engine intake when a purging operation is desired, and an EGR flow independent of the purge flow may be achieved when only an EGR operation is desired. By synergizing the exhaust treatment system and the EGR system, the number of components in the vehicle system may also be reduced. Further, by using an integrated valve system with a throttle valve coupled to an isolation valve, a wide range of flow adjustments may be performed without operating additional components.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The invention claimed is:

1. An engine exhaust, comprising,
a turbine upstream of:
   a first valve; and
   a second valve coupled to the first valve via a shaft, a first position of the shaft situating the first valve closed and the second valve open, a second position situating the second valve closed without flow and the first valve open, and a third position situating the second valve closed without flow and the first valve more open than the second position.

2. The engine exhaust of claim 1, further comprising an actuator coupled to the first and second valves, wherein the turbine is coupled to a compressor in an engine intake, and further comprising an emission control device downstream of the turbine.

3. The engine exhaust of claim 2, further comprising a controller having computer readable media with code thereon, the code including instructions to, during a first condition, adjust the actuator to operate the system in the first position, during a second condition, adjust the actuator to operate the system in the second position, and during a third condition, adjust the actuator to operate the system in the third position.

4. The engine exhaust of claim 3, further comprising:
   a first conduit with a first end and a second end, the first valve positioned in the first conduit, the second end communicating with an exhaust tailpipe;
   a second conduit having a first end and a second end, the first end of the second conduit coupled to the first end of the first conduit, and the second end of the second conduit coupled to the second end of the first conduit and also communicating with the exhaust tailpipe, the second valve positioned in the second conduit, the second conduit further including a hydrocarbon (HC) trap upstream of the second valve.

5. The engine exhaust of claim 4, wherein in the first position, exhaust gas flows through the HC trap of the second conduit before being vented to the atmosphere via the tailpipe.

6. The engine exhaust of claim 5, further comprising:
   a third conduit having a first end and a second end, the first end of the third conduit coupled to the first end of the second conduit via a HC trap bypass valve, the first end of the third conduit further coupled to the engine intake via an EGR valve, the second end of the third conduit coupled to the second end of the second conduit downstream of the HC trap and upstream of the second valve.

7. The engine exhaust of claim 6, wherein in the second and third positions, at least some exhaust gas is diverted to the engine intake, wherein the first condition includes exhaust HC storing, and wherein the second and third conditions include HC purging and/or EGR.

8. The engine exhaust of claim 7, wherein the controller further includes code with instructions for,
   closing both the EGR valve and the HC trap bypass valve during the HC storing condition;
   opening the EGR valve while closing the HC trap bypass valve during the HC purging condition; and
   opening both the EGR valve and the HC trap bypass valve during the EGR condition.

9. The engine exhaust of claim 8, wherein during the HC purging condition, at least some exhaust gas flows to the engine intake via the HC trap and the third conduit.

10. The engine exhaust of claim 8, wherein during the EGR condition, at least some exhaust gas bypasses the second and third conduits and flows to the engine intake.

11. The engine exhaust of claim 4, wherein the HC trap includes activated carbon and/or catalyzed zeolites, and wherein the first valve is a throttle valve, and the second valve is a ball valve.

12. The engine exhaust of claim 1, wherein an amount of valve opening is based on at least one of a desired HC trap inlet temperature, a desired exhaust catalyst temperature, and a desired amount of EGR.

13. A method for controlling a valve system in an engine exhaust, the valve system including a first valve and a second ball valve mounted on a common shaft, comprising:
   positioning the valve system in a first configuration with the first valve closed and the second ball valve open;
   positioning the valve system in a second configuration with the first valve open by a first amount and the second ball valve in a first closed position at a first angle without flow and with the ball blocking the flow; and
   positioning the valve system in a third configuration with the first valve open by a second, larger amount and the second ball valve in a second, still closed, position at a second angle without flow and with the ball blocking the flow, wherein the valve system is positioned downstream of a turbine of a turbocharger.

14. The method of claim 13, wherein the first valve is a throttle valve in a first conduit, and the second ball valve is in a second conduit disposed parallel to the first conduit, a first end of the first conduit communicating with a first end of the second conduit, and a second end of the first conduit communicating with a second end of the second conduit, the common shaft of the valve system operated by a common actuator, and wherein the engine exhaust is coupled to an engine intake via a low pressure exhaust gas recirculation (EGR) passage.

15. The method of claim 14, wherein the actuator is adjusted to position the valve system in the first configuration during a first mode to route exhaust gas to an exhaust tailpipe, the actuator is adjusted to position the valve system in the second configuration during a second mode to route at least some exhaust gas to the engine intake, and the actuator is adjusted to position the valve system in the third configuration during a third mode to route at least some exhaust gas to the engine intake.

16. The method of claim 15, wherein the second conduit includes a HC trap upstream of the second ball valve, the first end of the second conduit communicating with a first end of a third conduit, disposed substantially parallel to the second conduit, via a HC trap bypass valve, the second end of the second conduit communicating with a second end of the third conduit downstream of the HC trap and upstream of the second ball valve, the first end of the third conduit further communicating with the EGR passage via an EGR valve, and wherein during the second and/or third mode, routing exhaust gas to the engine intake includes,
   closing the HC trap bypass valve while opening the EGR valve to route at least some exhaust gas to the engine intake through the HC trap via the third conduit; and
   opening the HC trap bypass valve and the EGR valve to route at least some exhaust gas to the engine intake while bypassing the HC trap, and further bypassing the second and third conduits.

17. An engine exhaust system comprising,
a turbine;
a throttle valve positioned in a first conduit, a first end of the first conduit coupled to the engine exhaust and a second end of the first conduit coupled to an exhaust tailpipe;
a ball valve coupled to the throttle valve by a common actuator, the ball valve positioned in a second conduit, the second conduit disposed parallel to the first conduit with a first end of the second conduit coupled to the first end of the first conduit, and a second end of the second conduit coupled to the second end of the first conduit, upstream of the exhaust tailpipe, the first and second conduits communicating with exhaust downstream of the turbine;

a HC trap in the second conduit upstream of the ball valve, the HC trap including activated carbon and/or zeolites;

an EGR passage communicating with the engine intake, the EGR passage coupled to the first end of the second conduit via a HC trap bypass valve, and further coupled to the second end of the second conduit, upstream of the second ball valve, via a third conduit and an EGR valve; and a controller having computer readable media with code thereon including instructions for, adjusting the actuator to a first position to close the throttle valve while opening the ball valve;

adjusting the actuator to a second position to close the ball valve while opening the throttle valve by a first, smaller amount; and adjusting the actuator to a third position to close the ball valve while opening the throttle valve by a second, larger amount.

18. The system of claim 17, wherein in the first position, exhaust gas flows to the exhaust tailpipe via the second conduit, wherein in the second and/or third positions, exhaust gas flows to the engine intake via the EGR passage and wherein the controller further includes code for, with the actuator in the second and/or third position, opening the EGR valve while closing the HC trap bypass valve to direct exhaust gas to the EGR passage through the HC trap and the third conduit; and opening both the EGR valve and the HC trap bypass valve to direct exhaust gas to the EGR passage bypassing the HC trap and the third conduit.

* * * * *